Patented Feb. 17, 1925.

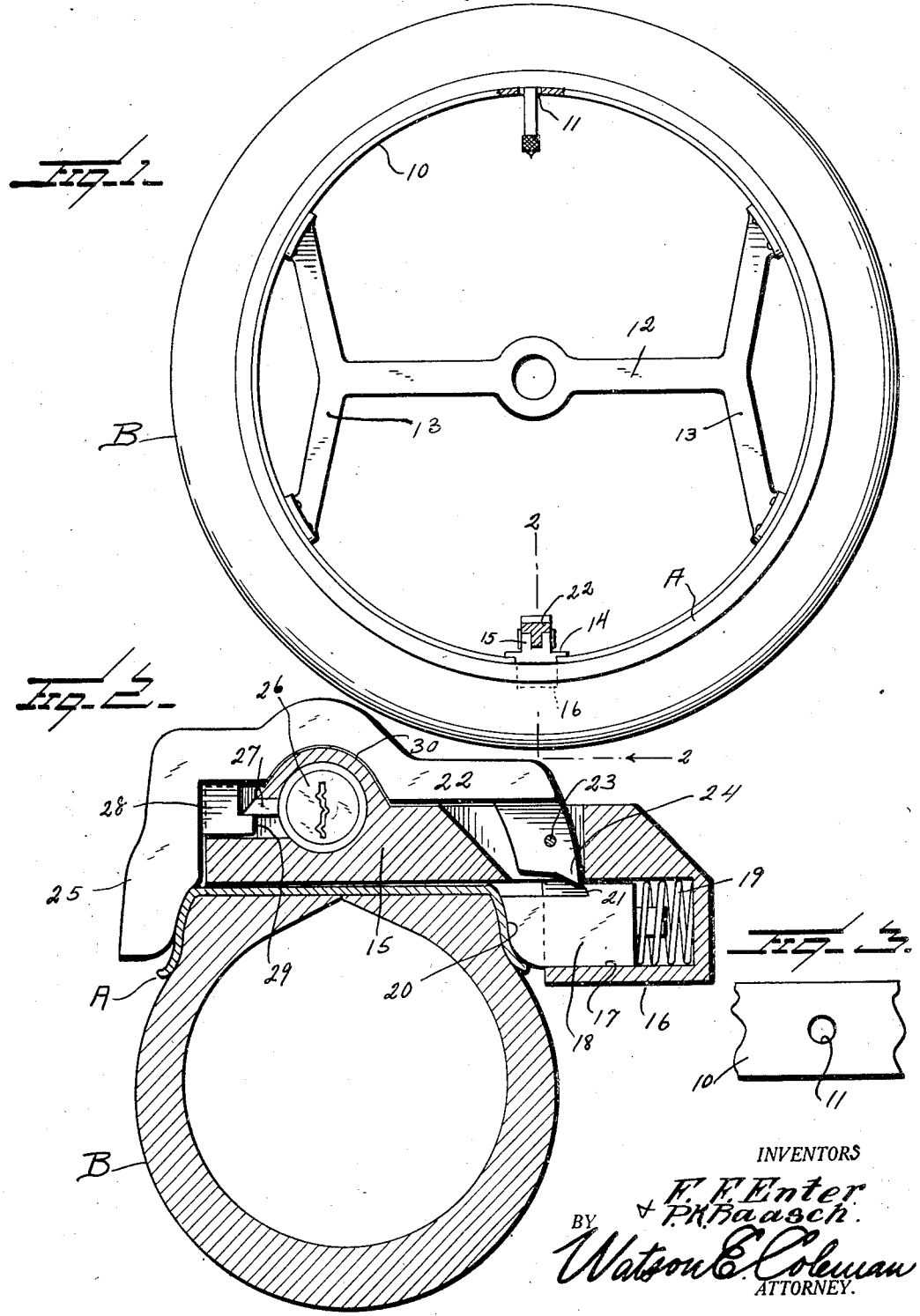

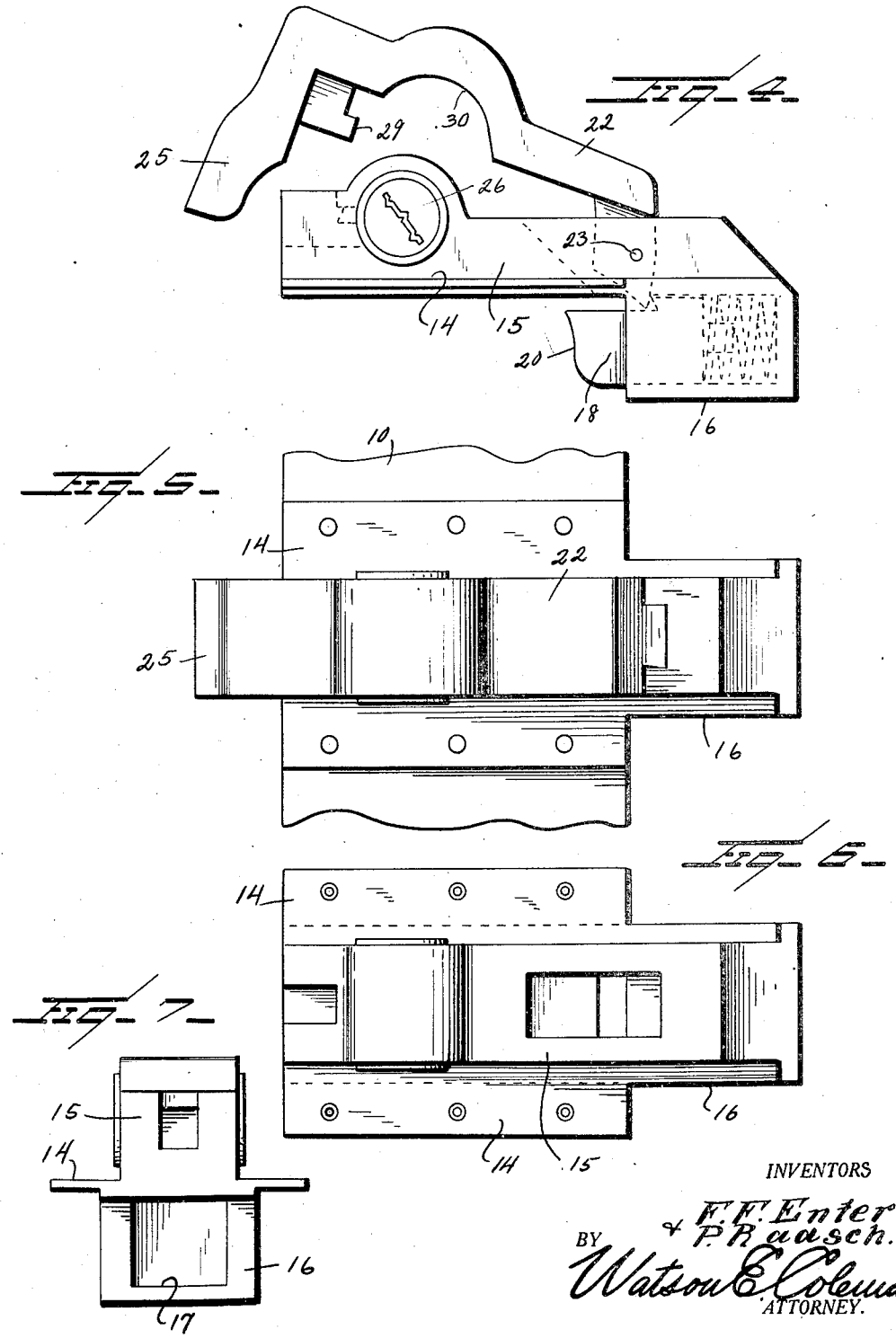

1,527,129

UNITED STATES PATENT OFFICE.

FRED F. ENTER, OF DETROIT, MICHIGAN, AND PAUL K. RAASCH, OF EAST AKRON, OHIO.

TIRE-CARRIER LOCK.

Application filed September 1, 1923. Serial No. 660,535.

*To all whom it may concern:*

Be it known that we, FRED F. ENTER and PAUL K. RAASCH, citizens of the United States, residing at Detroit and East Akron, respectively, in the counties of Wayne and Summit, respectively, and States of Michigan and Ohio, respectively, have invented certain new and useful Improvements in Tire-Carrier Locks, of which the following is a specification, reference being had to the accompanying drawings.

This invention relates to tire carrier locks, and particularly to a lock that may be used on the carrier of the felly band type.

The general object of this invention is to provide a lock of this character which is adapted to be applied to a felly band carrier merely by cutting out a small portion of the felly band at the bottom of the band opposite the valve hole and rivet the lock on.

A further object is to provide a lock of this character in which there is a spring pressed bolt forming a jaw and engaging one side of the wheel rim and a second jaw engaging the opposite side of the wheel rim and mounted on a lever, the spring pressed bolt keeping a constant tension on the tire and rim, thus eliminating rattle and also acting, when the lock is opened, to automatically shove the lever up and hold it up until another tire is put in position, the placing of the new tire and rim in position in the carrier snapping the lock shut.

A still further object is to provide a device of this character which will hold the tire securely until a key is used for releasing the lock.

Other objects will appear in the course of the following description.

Our invention is illustrated in the accompanying drawings, wherein:—

Figure 1 is a front elevation of a tire carrier of a standard form having our improved lock applied thereto;

Figure 2 is a section on the line 2—2 of Figure 1, the member 22 of the lock being shown in elevation;

Figure 3 is a fragmentary plan view of the rim 10, showing the opening for the valve 11;

Figure 4 is a side elevation of the lock showing it open to permit the removal of the tire and rim;

Figure 5 is a top plan view of the construction illustrated in Figures 2 and 4;

Figure 6 is a top plan view of the lower section of the lock;

Figure 7 is a front elevation of the lower section of the lock;

In the accompanying drawings, we have illustrated a tire carrier of the felly band type, the felly band being designated 10. This felly band is provided at one side with an opening 11 for the tire valve and is supported by a transverse brace 12 having branched arms 13. These parts may be of any suitable or usual description.

Riveted to the band 10 at a point opposite the valve opening 11 is a base plate 14, and integral with this base plate is a body 15 which extends over the base plate and at one end is formed with an inwardly extending portion 16 recessed, as at 17, for the reception of a bolt 18, this bolt being outwardly projected by a spring 19. The outer end face 20 of the bolt is curved to conform to the rim A of a tire B. The edge face of the bolt 18 adjacent the body 15 is recessed so as to form an overhung shoulder 21 for a purpose to be later described.

The body 15 is formed to provide upstanding walls between which is pivoted a lever 22, this lever being pivoted at 23 and the tail of the lever being formed with a tooth 24 adapted to be engaged by the shoulder 21. The free end of the lever is formed with a depending portion 25 which is adapted to fit against the outer flange of the rim A, as shown in Figure 2, when this lever 22 is closed.

It will be seen that the portion 25 and the bolt 18 provide opposed jaws between which the flanges of the rim are gripped. The body 15 is formed adjacent its forward end with a lock 26 of any suitable description but illustrated as a pin lock. This lock includes a bolt 27 which is retractible by the usual key inserted in the lock but which is normally projectable, the upper end face of this bolt being beveled, and the lever 22 adjacent its end portion 25 is formed with a downwardly extending lug 28 having an inwardly projecting lip 29 over which the bolt 27 engages. The lever 22 just rearward of the lug 28 has its inner face upwardly and inwardly curved, as at 30, to accommodate that portion of the body 22 which embraces and holds the pin lock.

It will be obvious that when the tire is placed in the carrier and the lever 22 is closed, the bolt 27 will engage over the lip 29 and lock the lever in its closed position and the jaw 25 in engagement with the side flange of the rim, while the jaw formed by the bolt 18 will bear yieldingly against the other side flange of the rim. Thus the rim will be held in place from removal. When, however, the bolt 27 is withdrawn by unlocking the lock 26, the lever 22 may be immediately lifted, thus releasing the tire and permitting its withdrawal from the carrier. Immediately that the tire and rim are withdrawn, the spring 19 will act to force the bolt 18 forward and the tooth 21 engaging the tooth 24 of the lever 22 will hold this lever raised. When a tire and rim are inserted within the carrier, however, the inward pressure on the bolt 18 will cause it to move backward so as to release the lever 22 and the lever 22 will fall in place and latch, thus automatically locking the tire and its rim in the carrier.

It will be obvious, of course, that the device will be made of various sizes to suit various sizes of tires and rims. We do not wish to be limited to the details of the construction as actually shown, as it is obvious that many changes might be made in these details without departing from the spirit of the invention.

We claim:—

1. The combination with a tire carrier, of means for locking the tire in place upon the carrier comprising a body operatively connected to the carrier and off-set at one end to project inward of the carrier and having a spring actuated jaw disposed in this end, a member pivoted to the body and adapted to be closed against the body and having a jaw adapted to confront the first named jaw, and means on the body for locking said member in its closed position.

2. The combination with a tire carrier, of means for locking the tire in place upon the carrier comprising a body operatively connected to the carrier and off-set at one end to project inward of the carrier and having a spring actuated jaw disposed in this end, a member pivoted to the body and adapted to be closed against the body and having a jaw adapted to confront the first named jaw, and means on the body for locking said member in its closed position, the pivoted member and the first named jaw so coacting that when the tire is removed from between the jaws the spring projected bolt will swing the second named member on its pivot to withdraw the jaw formed therewith.

3. The combination with a tire carrier having an aperture for the passage of the tire valve stem, of a lock for the tire mounted upon the carrier opposite the valve stem, said lock comprising a body portion attached to the tire carrier and off-set at one end to provide an inwardly projecting member, a spring projected, rectilinearly movable jaw disposed in said member and adapted to bear against one side of the tire rim, a lever pivoted to said body adjacent the off-set end thereof, said lever at its free extremity having an angularly extended portion, a jaw adapted when the member is closed to form a jaw coacting with and opposed to the first named jaw and adapted to engage the rim, the member adjacent its free end having an inwardly extending lug and a laterally extending lip, and a lock carried by the body and having a projectible bolt adapted to engage over said lip and lock the member to the body against pivotal movement, the spring actuated jaw having a shoulder and the member beyond its pivot having a tooth with which said shoulder is adapted to engage when the tire and rim are removed from the carrier to thereby cause the spring actuated jaw to lift the free end of the member.

4. A locking device of the character described comprising a base, a body carried by said base and having at one end a depending portion formed with a recess, a spring actuated, rectilinearly movable jaw mounted in said recess, a spring urging said jaw outward, one face of the jaw having a shoulder, the body being formed with oppositely disposed, longitudinally extending flanges, a lever pivoted between said flanges, the lever at its free end having an angularly extending portion forming a jaw and adapted to confront the first named jaw when the lever is turned against the body, said lever having an inwardly extending lug, a lip, and a key actuated lock mounted in the body and including a bolt adapted to engage said lip, the lever beyond its pivotal end being formed to provide a tail terminating in a tooth adapted to be engaged by the shoulder on the spring actuated jaw to thereby shift said lever on its pivot when the tire and rim are removed from the carrier and to permit the lever to shift to its locking position when a tire and rim are inserted in the carrier and forced against the face of the spring actuated jaw.

5. The combination with a tire carrier, of means for locking the tire in place thereon comprising two coacting members relatively shiftable into or out of locking position, a spring urging one of said members from a predetermined position upon removal of a tire and rim from between said members, the shifting of said member under the action of said spring acting to shift the other member out of its operative tire engaging position.

6. In a tire carrier of the character described, opposed rim-engaging jaws, one of said jaws being resiliently forced toward the other jaw whereby to yieldingly grip the tire and rim and having a beveled face to engage against the beveled face of a rim flange and prevent rattling, the other of said jaws being pivoted for movement toward and from the rim and having a beveled face confronting the beveled face of the opposed jaw and adapted to engage the opposite rim flange, and means for locking the jaws in a rim-engaging position.

7. The combination with a tire carrier, of means for locking the tire in place comprising a body attached to the tire carrier and formed to provide an off-set portion, a resiliently projected jaw disposed in said off-set portion, a jaw pivoted to the body and movable into position opposed to the first named jaw, and means for locking the jaws in the last named position, the spring projected jaw acting to yieldingly grip the tire and rim between the two jaws to thereby prevent rattling.

In testimony whereof we hereunto affix our signatures.

FRED F. ENTER.
PAUL K RAASCH.